US006504956B1

(12) United States Patent
Gannage et al.

(10) Patent No.: US 6,504,956 B1
(45) Date of Patent: Jan. 7, 2003

(54) METHOD AND APPARATUS FOR DIGITALLY CAPTURING HANDWRITTEN NOTES

(75) Inventors: Michel E. Gannage, Los Altos, CA (US); Nagesh Challa, Saratoga, CA (US); Venkata T. Gobburu, San Jose, CA (US)

(73) Assignee: Ecrio Inc., Cupertino, CA (US)

(*) Notice: Subject to any disclaimer, the term of this patent is extended or adjusted under 35 U.S.C. 154(b) by 0 days.

(21) Appl. No.: 09/412,212

(22) Filed: Oct. 5, 1999

(51) Int. Cl.$^7$ ............................. G06K 9/00; G06K 11/06; G09G 5/00
(52) U.S. Cl. .................. 382/188; 382/189; 382/315; 345/173; 345/179; 178/18.03
(58) Field of Search .................. 382/188, 189, 382/187, 190, 195, 312, 313, 314, 315, 320; 345/168, 169, 173, 179, 802, 835; 178/18.01, 18.03; 707/530; 361/683

(56) References Cited

U.S. PATENT DOCUMENTS

| | | | |
|---|---|---|---|
| 5,049,862 A | 9/1991 | Dao et al. ................ 345/179 |
| 5,105,338 A | 4/1992 | Held ........................ 361/683 |
| 5,241,303 A | 8/1993 | Register et al. ........... 345/168 |
| 5,559,942 A | 9/1996 | Gough et al. ............. 345/802 |
| 5,587,560 A | 12/1996 | Crooks et al. ........... 178/18.03 |
| 5,629,499 A | 5/1997 | Flickinger et al. ....... 178/18.01 |
| 5,737,740 A | 4/1998 | Henderson et al. ....... 707/530 |
| 5,917,493 A * | 6/1999 | Tan et al. ................. 345/835 |
| 6,259,043 B1 * | 7/2001 | Clary et al. ............. 178/18.01 |
| 6,351,259 B2 * | 2/2002 | Breiner ..................... 345/173 |
| 6,362,440 B1 * | 3/2002 | Karidis et al. .......... 178/18.01 |

FOREIGN PATENT DOCUMENTS

| | | | |
|---|---|---|---|
| DE | 197 40 587 A1 | 4/1999 | |
| EP | 0 615 209 A2 | 9/1994 | ........... G06K/11/06 |
| EP | 0 618 715 A1 | 10/1994 | |
| EP | 0 641 095 A1 | 3/1995 | |
| EP | 0 935 383 A1 | 8/1999 | |
| WO | WO 95/21436 | 8/1995 | |

OTHER PUBLICATIONS

3M Company, Post–It® Products: Post–It® Software Notes, 1998.

(List continued on next page.)

*Primary Examiner*—Joseph Mancuso
*Assistant Examiner*—Mehrdad Dastouri
(74) *Attorney, Agent, or Firm*—Dorsey & Whitney LLP

(57) ABSTRACT

The note capture device enables a user of any type of image capture device to enjoy the advantages of handwritten notes while having access to the power and flexibility offered by standalone as well as networked computing devices for information storage, retrieval, modification, and communication. The major elements of the note capture device are a housing which contains preferably an electromagnetic digitizer tablet, a small notepad such as a Post-it® Notes product or a small paper pad overlying the region of the housing that contains the digitizer tablet, a pen that works in conjunction with the electromagnetic digitizer tablet in the housing, and a wireless or wired connection to a host computer. The notepad has a removable paper writing surface and the pen includes an inked tip of any desired type so that the user experiences a comfortable and familiar feel of pen/pencil on paper as he or she writes on the notepad. The host computer runs an image capture application that captures the pen strokes from the note capture devices and displays them on the screen in a virtual note. The image capture application also is able to post virtual notes on documents created by other programs, including word processors and memoboard applications, and to create note files. The notes are available to the user or may be shared with other users.

8 Claims, 9 Drawing Sheets

OTHER PUBLICATIONS

3M Company, News Room: Post–It® Software Notes for Internet Designers Grab Hold on the Web, Oct. 7, 1998.

3M Company, News Room: 3M Really Sticks to the the Web, Aug. 25, 1998.

3M Company, Post–It® Notes Help Web Content "Stick" Around, Nov. 24, 1997.

3M Company, News Room: Post–It® Software Notes, Dec. 4, 1996.

Actual Software Corporation, Products, http://www.actualsoft.com/products.html, printed Apr. 18, 1999.

A.T. Cross Company, CrossPad™ Portable Digital Notepad, 1998.

British Telecommunications plc, Innovation & Technology Exhibition: Future Pen Overview & Whitepaper, 1999 (printed Oct. 4, 1999).

Smartcode Software, Inc., Company Information & Communication Software for Mobile Professionals, http://www.smartcodesoft.com/products/handhelds/hh_products.html, printed Apr. 18, 1999.

* cited by examiner

METHOD AND APPARATUS FOR DIGITALLY CAPTURING HANDWRITTEN NOTES

BACKGROUND OF THE INVENTION

1. Field of the Invention

The present invention relates to digital electronic notetaking, and more particularly to apparatus and methods for digitally capturing handwritten notes.

2. Description of Related Art

In the mid-1970s, a scientist at the Minnesota Mining and Manufacturing Company ("3M") of St. Paul, Minn. took two common materials, adhesive and paper, and combined them to create a useful office product, Post-it® Notes. The first Post-it Notes products were introduced in the United States in 1980 and in Europe in 1981. These are small pieces of paper on which one can jot down a note. The individual Post-it Notes sheets are self-stick and removable and can be stuck to a desk, a computer monitor, a refrigerator, and most other common surfaces. The 3M Company sells the Post-it Notes in different sizes and colors; for example, 3"×3" as well as 2"×1.5" are very popular sizes, and yellow, green, orange, purple, and pink are some of the colors used today. In fact, Post-it Notes are available in 29 colors and in 56 shapes and 27 sizes, and can be dispensed from 22 different dispensers. That makes for millions of possible combinations. In addition, Post-it Notes are available with 20 Microfragrance™ encapsulated fragrances, creating aromatic combinations.

Post-it Notes are very popular. In an office environment, it is quite common for example to have a company worker jot down a note on a Post-it Note and stick it on the computer monitor or on the chair of a co-worker. Some of the uses of Post-it Notes are as follows: jot down a note as a reminder for a given event; jot down a note for a colleague; write a phone number; jot down a note, address or phone number while talking on the phone. Post-it Notes are popular at home, where it is quite common for members of a family to leave each other a Post-it note on the refrigerator. Students use Post-it Notes as bookmarks. Lawyers use Post-it Notes to annotate documents. Post-it Notes have become very popular and are used today in a myriad of ways.

With the advent of the computer technology and the Internet, a need for electronically storing notes, organizing notes and sending electronically notes to co-workers or to family members has developed. Various approaches for addressing this need have been developed, including products such as Microsoft® Outlook™ E-mail and personal information manager. However, present day computing devices are input challenged. Consider the personal computer ("PC"), for instance, which offers as a primary input interface the keyboard and the mouse. Other types of input devices are exemplified by the CrossPad™ portable digital notepad and by graphics tablets, but these types of input devices have limited applications.

The CrossPad™ portable digital notepad, which is available from A.T. Cross Company of Lincoln, R.I., empowers a user to capture his or her thoughts with ink on paper, and to store the writings digitally in the memory of the notepad. Many pages of notes can be stored in the memory of the digital notepad, and an existing page can be added to by opening the desired digital page using controls on the digital notepad, and then replacing the correct actual inked physical page over the pad. The digital page is not viewable in real time. Instead, the digital notes are transferred from the memory of the notepad to the user's PC over a thin cable that connects to the RS232 port on the PC. Using Ink Manager software available from IBM Corporation of Armonk, N.Y., the user is able to use his or her personal computer to look at the digital notes, to organize the digital notes in one place in "notebook" files, to assign keyword, bookmark, and date to notes and search them, to convert selected words and phrases to text, to cut and paste notes or sketches into a variety of Microsoft® Windows® operation system applications, and to share notes by e-mail directly from the PC.

One type of marking device known as the Future Pen uses a spatial sensing system (accelerometers) to track the pen's position and an "inkwell" to synchronize files on the pen with desktop based applications. See, e.g., British Telecommunications PLC, Future Pen Overview, http://innovate.bt.com/showcase/future_pen/index.htm, Oct. 4, 1999; British Telecommunications PLC, Future Pen Whitepaper, http://innovate.bt.com/showcase/future_pen/index.htm, Oct. 4, 1999.

Graphics tablets are available from a variety of manufacturers and are widely used by computer aided design workers and graphical artists to create graphical works. Graphics tablets are commonly electromagnetic, having an active stylus that is pressed against a flat surface to create pen strokes that are displayed on the screen of a computer as they are made. Some graphics tablets sense pen pressure and tip angle so that the creator of the work can create a variety of different line widths and intensities. Graphics tablets typically are used for input into graphics and CAD applications.

To capture and store handwritten notes such as Post-it Notes on a PC, one may scan them using a scanner cabled to the personal computer. The scanning process in particular quickly becomes unworkable as the frequency and diversity of notes increase, which include quick notes while attending meetings and while working, and random bits of information such as telephone numbers, directions, or telephone conversation notes.

In an effort to replicate the Post-it Note experience on a personal computer despite the input limitations thereof, the 3M Company has developed Post-it Software Notes that uses the keyboard for data entry and runs on IBM compatible PCs with Microsoft Windows operating system version 3.1 or higher. This product allows a computer user to use a computer keyboard and mouse to type a note and electronically "stick" it in the desktop window. Using the computer keyboard and mouse as appropriate, a user may do many other useful things, such as, for example, create memoboards on which multiple notes can be attached, organize notes on customized memoboards, set an alarm for each note, cause each note to be date and time stamped (automatically if desired), search for notes, organize notes in alphabetical order or by date, change the color of a note or the color of the memoboard, and attach a note to a Microsoft Application such as Word or Exel. In an office environment where the computers are connected directly to a LAN running TCP/IP network protocol, the 3M Post-it Software Notes allows a user to pop-up a note on a co-worker's computer and share notes and memoboards with co-workers.

The 3M Post-it Software Notes is a useful tool for computer proficient users who are comfortable with keyboard and mouse entry of data in the performance of tasks for which conventional input devices such as keyboard and mouse are satisfactory. However, the tool is inconvenient for users who are not comfortable with computers, and is not useful for some tasks such as sketching and writing in foreign languages that are not supported by keyboard data entry.

SUMMARY OF THE INVENTION

One embodiment of the invention is a note capture apparatus comprising a structural supporting medium; a notepad mounted on the structural supporting medium, the notepad comprising a plurality of stacked adhesive-backed note sheets; a handwriting digitizer disposed proximate to the note pad; and a communications port.

Another embodiment of the invention is a method of capturing handwritten notes from a notepad onto an image capture device, comprising creating a virtual note on the image capture device, the virtual note being a representation of a sheet of the notepad; detecting a pen action resulting from a stroke of a pen on the notepad sheet; digitizing the pen stroke to obtain a digital representation thereof, in real time with the pen stroke; capturing the digital representation of the pen stroke on the virtual note, in real time with the pen stroke; and associating the virtual note with a virtual document existing on the image capture device.

A further embodiment of the invention is a method of capturing handwritten notes from a notepad comprising a plurality of stacked adhesive-backed note sheets onto an image capture device having a viewing screen, comprising creating a virtual note on the image capture device, the virtual note being a representation of one of the adhesive-backed sheets of the notepad; detecting a pen action resulting from a stroke of a pen on the notepad sheet; digitizing the pen stroke to obtain a digital representation thereof, in real time with the pen stroke; capturing the digital representation of the pen stroke on the virtual note, in real time with the pen stroke; associating the virtual note with a virtual document existing on the image capture device; and displaying the virtual note with the virtual document on the viewing screen, in real time with the pen stroke.

Another embodiment of the invention is a computer program product comprising a computer readable medium having program logic recorded thereon for enabling a computer-enabled apparatus to capture pen strokes on a notepad comprising a plurality of stacked adhesive-backed note sheets onto an image capture device having a viewing screen, in real time, the computer program product comprising means for creating a virtual note on the computer-enabled apparatus, the virtual note being a representation of one of the adhesive-backed sheets of the notepad; means for capturing digital representation of the pen strokes on the virtual note, in real time with the pen strokes; means for associating the virtual note on a virtual document existing on the computer-enabled apparatus; and means for displaying the virtual note with the virtual document on the viewing screen, in real time with the pen stroke.

A further embodiment of the invention is a method of capturing handwritten notes from a notepad onto an image capture device having a viewing screen, comprising associating the notepad with an application on the image capture device; detecting a pen action resulting from a stroke of a pen on the notepad sheet; opening a virtual document under the application in response to the detecting step; posting a virtual note on the virtual document, the virtual note being a representation of a sheet of the notepad; capturing the pen stroke digitally on the virtual note, in real time with the pen stroke; and displaying the virtual note on the virtual document on the viewing screen, in real time with the pen stroke.

DETAILED DESCRIPTION OF THE PREFERRED EMBODIMENT

Handwriting is one of the oldest and most natural solutions for capturing information quickly and efficiently. It offers the distinct advantages of being personal, portable, universal, inexpensive and reliable. Even today, with the myriad of computing devices available on the market, including portable devices such as PDAs and notebook computers, most of us reach for a pen and paper to rapidly jot down notes. In fact, the pen and paper notebook or notepad are the most commonly used instruments in meetings even among computer savvy professionals.

Figure 1:
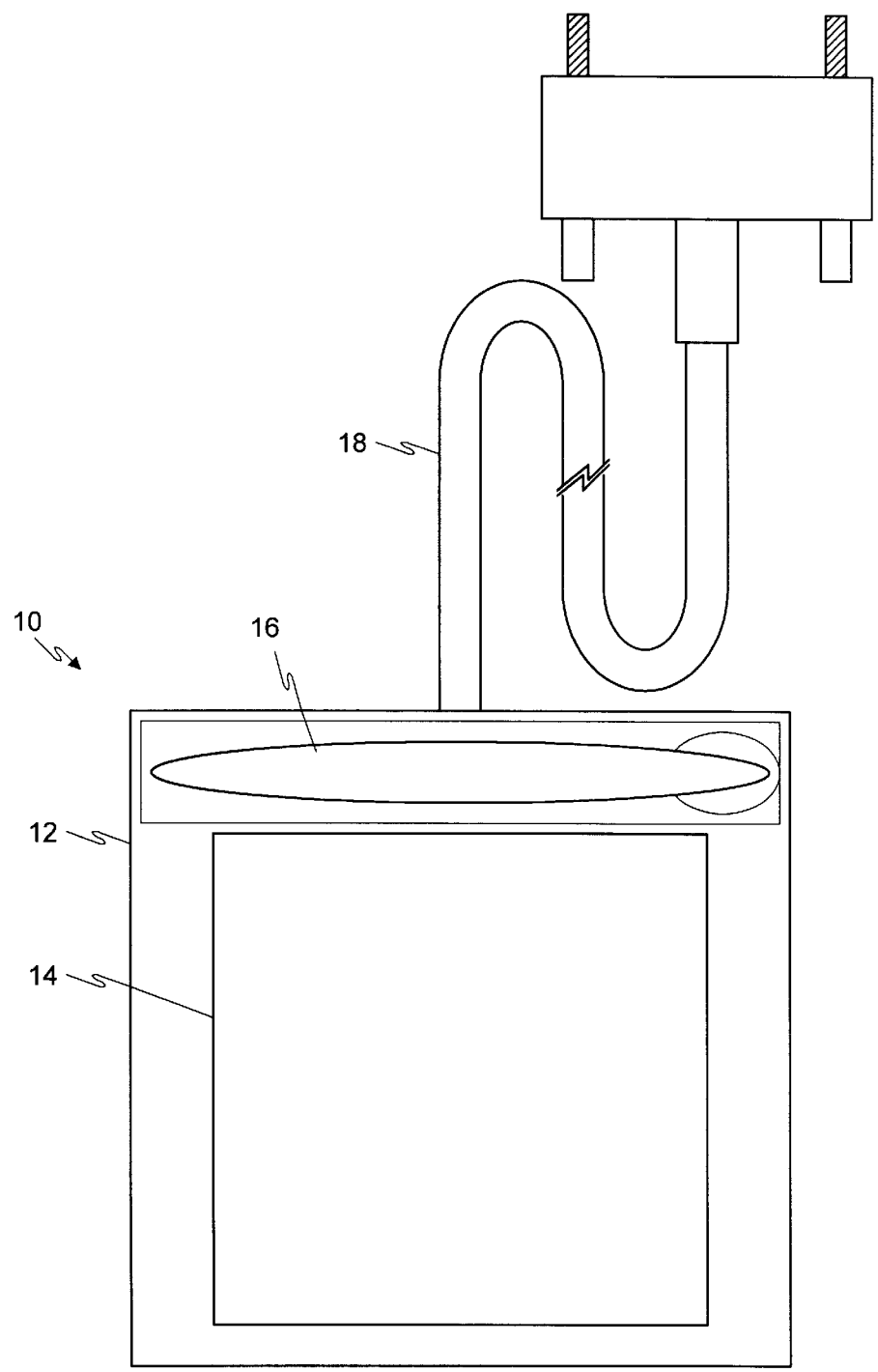
FIG. 1 is a pictorial view of the upper surface of a note capture device.

The note capture device shown in FIG. 1 enables a user of any type of image capture device to enjoy the advantages of handwritten notes while having access to the power and flexibility offered by stand alone computing devices as well as networked computing devices for information storage, retrieval, modification, and communication. Because of advances in machines that perform computing, display and communications functions, a wide variety of devices are presently available that are able to capture digital images and perform a variety of other functions, and even more powerful and/or cost effective designs are expected to be developed. These devices include servers, workstations, personal computers, notebook computers, network computers, personal data assistants (PDAs), Internet terminals and kiosks, consumer wireless internet access devices ("CADs"), personal communication system ("PCS"), multi-function wireless phones, computing or "smart" appliances, TV set top boxes, Internet TVs, and so forth.

FIG. 1 is a pictorial view of the upper surface of a basic note capture device 10 for a host computing device that enables easily recording and capture on the host computing device of a handwritten note made on a small adhesive-backed note sheet such as a Post-it Note. Although the note capture device 10 is suitable for or easily modified for a variety of different computing devices, the description pertaining to FIG. 1 makes reference to a personal computer as an illustrative example of one type of suitable host computing device.

The major elements of the input device 10 visible to the user are a housing 12, which contains preferably an electromagnetic digitizer tablet (not shown), a small notepad 14 preferably made of stacked adhesive-backed note sheets such as a Post-it Notes product overlying the region of the housing 12 that contains the digitizer tablet, an active pen 16 that both writes on the notepad 14 in ink and works in conjunction with the electromagnetic digitizer tablet in the housing 12, and an RS232 serial cable and connector 18 to connect the digitizer tablet to the host computer. Note that the electromagnetic digitizer tablet of the capture device 10 requires no batteries since power is available from the RS232 port of the host computer. Illustratively, the housing 12 is 4"×4" and less than ½" in height, a size which accommodates a standard 3"×3" Post-it® Note and fits nicely next to a keyboard.

The notepad 14 presents a writing surface that visually displays impressions made on it. Preferably, the notepad 14 has a removable paper writing surface that is adhesive-backed, and the pen 16 includes an inked tip of any desired type (standard ball point, felt marker, pencil lead, plastic channeled, fountain, and so forth) so that the user experiences a comfortable and familiar feel of pen/pencil on paper as he or she writes on the notepad 14. If a true "pen/pencil on paper" feel is not required or desired and the user does not desire to post the physical note using its adhesive backing, any other surface and associated marking instrument for making visual perceivable impressions may be used. Examples of other suitable papers and inks include a white-board type surface where the ink is an erasable ink, and a plastic sheet that visualizes impressions by making contact with an underlying surface under the pressure of a stylus where the ink is the lines of contact between the plastic and the underlying surface. If the user does not desire to post the physical note using its adhesive backing, a notepad containing ordinary paper may be used.

An electromagnetic digitizer tablet is preferred because such tablets are able to digitally capture writing/drawing strokes made by a associated stylus at varying distances from the tablet surface, which is the case as sheets of the notepad 14 are inked and removed from the notepad 14. The pen 16 is provided with a small internally battery powered electromagnetic transmitter internally mounted near the tip, which is tracked by the electromagnetic digitizer tablet. Alternatively, the pen 16 may pick up power wirelessly from the electromagnetic digitizer tablet. The pen 16 is also provided with a sensor for detecting when the tip is in contact with the notepad 14. The sensor preferably is a pressure-sensitive mechanical switch although other types of contact sensors such as capacitive may be used if desired. When the pen tip is in contact with the notepad 14, the electromagnetic signal from the pen 16 is altered in any suitable way to indicate contact. The electromagnetic digitizer tablet in turn generates a packet of information indicating the x,y position of the pen 16 and whether the tip of the pen 16 is in contact with the notepad 14. Electromagnetic tablets are available in a variety of appropriate form factors from a number of manufacturers. While the note capture device 10 is described with reference to an electromagnetic digitizer tablet, it will be understood that the digitizer tablet is not limited to that particular type, but may be any type of device having the ability to digitally capture writing/drawing strokes and an appropriate form factor. For example, if the digitizer is responsive to pressure (resistivity), the pen need be no more than an ordinary passive pen or pencil. When the digitizer uses laser tracking, the pen is provided with a suitable target material at the tip. Ultrasonic tracking may also be used. A pen may also be equipped with a spatial sensing system using accelerometers to track the pen's position and an RF transmitter to communicate the position information in real time to a receiver in the tablet, or directly to the host computer if the transmitter is designed to be powerful enough. In this event, the tablet may be entirely passive or may be dispensed with entirely.

While the RS232 serial cable and connector 18 is an inexpensive way to connect power to the digitizer tablet and connect it to the host computing device, other hardwire connection technology such as a Universal Serial Bus ("USB") may also be used. Wireless connection technology such as IrDA infrared, the BlueTooth RF technology which is available from Ericsson, Inc. of Stockholm, Sweden, Dallas, Tex., and Miami, Fla., and the Jini™ connection technology which is available from Sun Microsystems, Inc. of Mountain View, Calif., may be used if desired. Known techniques such as secure addressing schemes and frequency hopping allow many devices to be in communication locally without interference.

Figure 2:
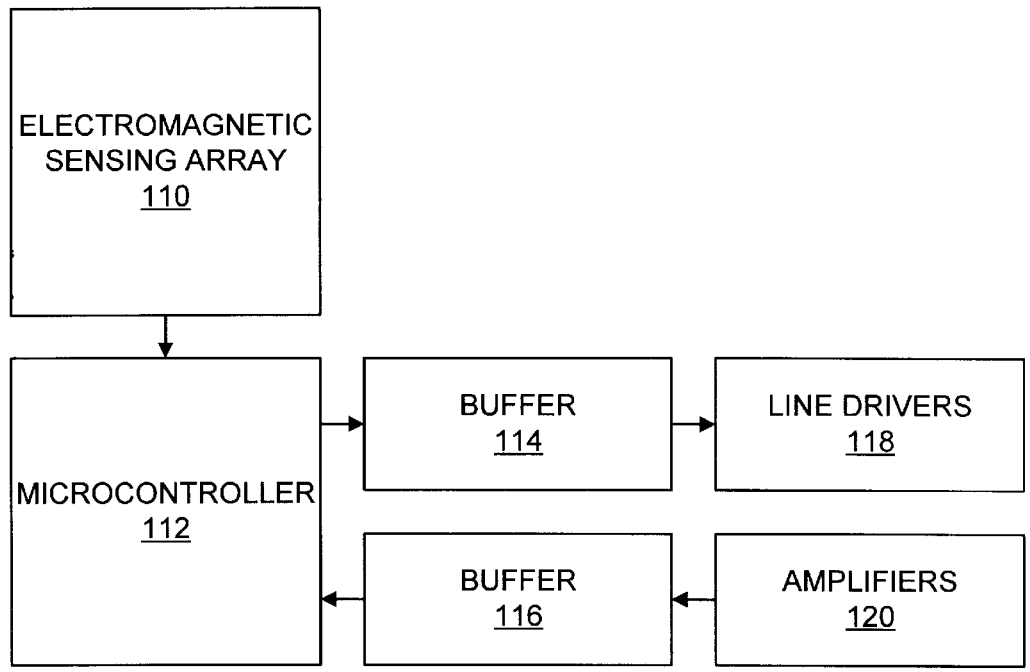
FIG. 2 is a schematic block diagram of the electronic circuit elements of the note capture device of FIG. 1.

FIG. 2 is a schematic block diagram showing the major electrical components of the note capture device 10. A microcontroller 112 controls the detection of pen movement from an electromagnetic sensing array 110. The microcontroller 112 also controls communications with the host computer, sending out handshake signals and data signals to the host via buffer 114 and RS232-compliant line drivers 118, and receiving handshake signals from the host computer via RS232-compliant amplifiers 120 and buffer 116. The electromagnetic sensing array 110, microcontroller 112, buffers 114 and 116, line drivers 118, and amplifiers 120 are all sufficiently low power devices so that they can operate from power available at the RS232 port of the host computer.

The note capture device 10 cooperates with note capture application software running on the host (for example an IBM compatible personal computer running the Microsoft Windows operating system). As soon as the pen 16 contacts the notepad 14, the note capture application software detects this pen down condition and a note sheet, illustratively a 3"×3" Post-it Notes style note sheet, pops up on the computer screen. The sheet displayed on the computer screen is a virtual Post-it Note in that it does not exist physically but otherwise has many of the salient properties of the physical Post-it Note, especially the ability to be posted on documents and other objects displayed on the computer screen just as a physical Post-it Note has the ability to be posted on paper documents and refrigerator doors. Alternatively, the user can pop up an already existing note and start editing it. The user then jots down a note and the ink is digitally captured and displayed electronically on the screen. The user can use a mouse to signal to the note capture application that the input capture of the note is completed. Alternatively, the user can tap the tip of the pen on a pre-assigned location (for example on the right bottom side) of the note sheet to terminate and save the handwritten note onto a memoboard. The note is automatically date and time stamped, if desired, or may be manually date and time stamped.

The images captured and stored by the host computer from the note capture device 10 are useful in a wide variety of ways depending on the capabilities of the host computer and the interests of the user. For example, notepad digital images may be overlaid on top of screen-displayed documents such as, for example, word processor documents, spreadsheet documents, CAD drawings, and data base reports to mark and comment on the contents thereof. Notepad digital images may also be assigned tags or names, stored on memoboards and organized in various ways such as by alphabetically by assigned tag or by date and time, moved from memoboard to memoboard, redisplayed on other screens, communicated in a variety of ways such as over cables, over wired and wireless networks, and over hybrid networks such as the World Wide Web, communicated by electronic mail, and acted upon in a myriad of other ways by various other readily available organization, communication and display applications that can be readily modified for the purpose. A memoboard may be implemented as a folder, and the notepad digital images may be displayed in a cascaded manner or tiled next to each other. The color of the notepad digital images can be changed so that specific groups of items can share the same color. The notepad digital images can be sized up or down. The notepad digital images can have an alarm to be set to a particular day and time. When open, each notepad digital image preferably has a small icon displayed on it—for example, on the top left side of the note—which when selected with a mouse click displays a pull down menu to allow any of the previously described functions to be performed.

The notepad digital images are saved in any suitable format. Suitable vector formats include those compliant with the JOT or UNIPEN standards, see, e.g., JOT: A Specification for an Ink Storage and Exchange Format, Version 1.0, Mar. 14, 1996, available from Slate Corporation of Scottsdale, Ariz., as well as the EDF format of the Ecritek Corporation, Cupertino, Calif. Other suitable formats include bit map (*.bmp) and various compressed file formats such as GIF (*.gif ) and JPEG (*.jpg).

The notepad digital images can be printed, faxed or e-mailed as attachment in EDF format, or alternatively can be converted to a more standard format and then e-mailed. Many standard applications are available from various vendors to handle these activities. When the notes are e-mailed in EDF format, the EDF viewer which is very small in size (10 Kbytes) can be e-mailed as well together with the notepad digital images.

The note capture application software residing on the host allows typed text to be merged with captured images. For example, a user who begins by handwriting a note or sketching an object on the physical notepad may continue the note by typing text to the electronic note using the keyboard of the host computer. A user who begins by typing text into the electronic note using the keyboard of the host computer may continue by annotating typed material with handwriting or by sketching an object using the physical notepad.

The note capture device 10 may also be used to access various applications running on PDAs such as the popular PDAs of the Palm™ family of connected organizers, which are available from Palm Computing, Inc. of Santa Clara, Calif. For example, e-mail transmission of any note created with the note capture system 10 when used with a PDA such as the Palm connected organizer is achieved by using any suitable email applications, including, for example, Multi-Mail, which is available from Actual Software Corporation of Andover, Mass., and HandMail, which is available from Smartcode Software, Inc. of San Diego, Calif. Multi-Mail, for example, provides the ability to attach any memo to an outgoing email. The image memo is first converted into a transient GIF or other small footprint format file, and then attached to the email, and then read on the PDA when received. Faxing an image note is achieved by providing a plug-in that creates a TIFF file that is faxed out from a fax application such as HandFax, which is available from Smartcode Software, Inc. of San Diego, Calif. Beaming an image note from one PDA to another is achieved over an infrared link using the standard capabilities of the PDAs. The image memo is converted into a transient GIF or other small footprint format file at the transmitting PDA and then read on the receiving PDA when received. Printing of an image memo is achieved from, for example, copying an image memo to a desktop computer and printing it on a local printer using standard desktop image viewing or word processing applications. Alternatively, software is available to convert the image memo to a suitable printer format and beaming the converted image memo directly from the PDA to a printer having an infrared port. Suitable software includes PalmPrint, which is available from Stevens Creek Software of Cupertino, Calif. The note capture device 10 may be used to access the various applications running on PDAs in a manner more fully described in U.S. patent application Ser. No. 09/294,249 filed Apr. 19, 1999 (Challa et al., Portfolio Apparatus for Portable Handwriting Capture, Attorney Docket No. A1090US) and in U.S. patent application Ser. No. 09/294,250 filed Apr. 19, 1999 (Challa et al., Apparatus and Method for Portable Handwriting Capture, Attorney Docket No. A1091US), which hereby are incorporated herein by reference in their entirety.

The note capture device 10 also is useful for creating notes on and providing input to other types of computing and communication devices, including devices such as television set top boxes, smart televisions, and Internet terminals and kiosks which may be oriented toward the World Wide Web.

The note capture application software preferably runs in the background on the host computer, allowing the user to click on an icon in order to pop up a notepad sheet in several off-the shelf and widely used applications. A couple of examples are as follows.

EXAMPLE 1

Annotating a Microsoft Word or Excel Document.

A lot of professionals such as lawyers, engineers, and businessmen need to often review documents. During the review process, the professional might need to add notes to the document. Clicking on the icon with the mouse pops up a notepad sheet at the place where the cursor resides. Alternatively, the note can be popped up from the paper pad itself by tapping the pen on a specific location such as the right top area of the notepad 14. The professional can then start writing on the notepad sheet and the ink will be simultaneously captured and displayed on the electronic note inside the Application. When completed, the professional closes the note by, for example, tapping the pen on the right bottom side of the notepad 14. Once closed, the note appears inside the Word document as a small icon. Double clicking on the small icon opens the note, which includes a menu icon on, for example the top left side of the notepad 14. Clicking on the icon displays a pull down menu which allows various operations to be performed, such as changing the color or printing the note. The note may also be dragged from application to application.

EXAMPLE 2

Seamless Interface to a Personal Information Manager

The application software is running in the background. If a personal information manager such as Microsoft Outlook software is also running on the desktop PC and the address Contact window is opened, a telephone number or a note can be added to an address entry very easily. The user starts by writing and the note automatically attaches to the address entry of the open Contact window. The notepad digital image is closed by, for example, tapping the pen on the right bottom side of the notepad 14, or by clicking on the top left of the displayed notepad to cause the pull down menu to appear. In a similar way, a notepad digital image can be attached to the Calendar, Tasks and Notes applications of Outlook. Notes can be dragged from one application to another and can be attached to an outgoing e-mail and placed in the Outbox of Outlook.

Figure 3A:
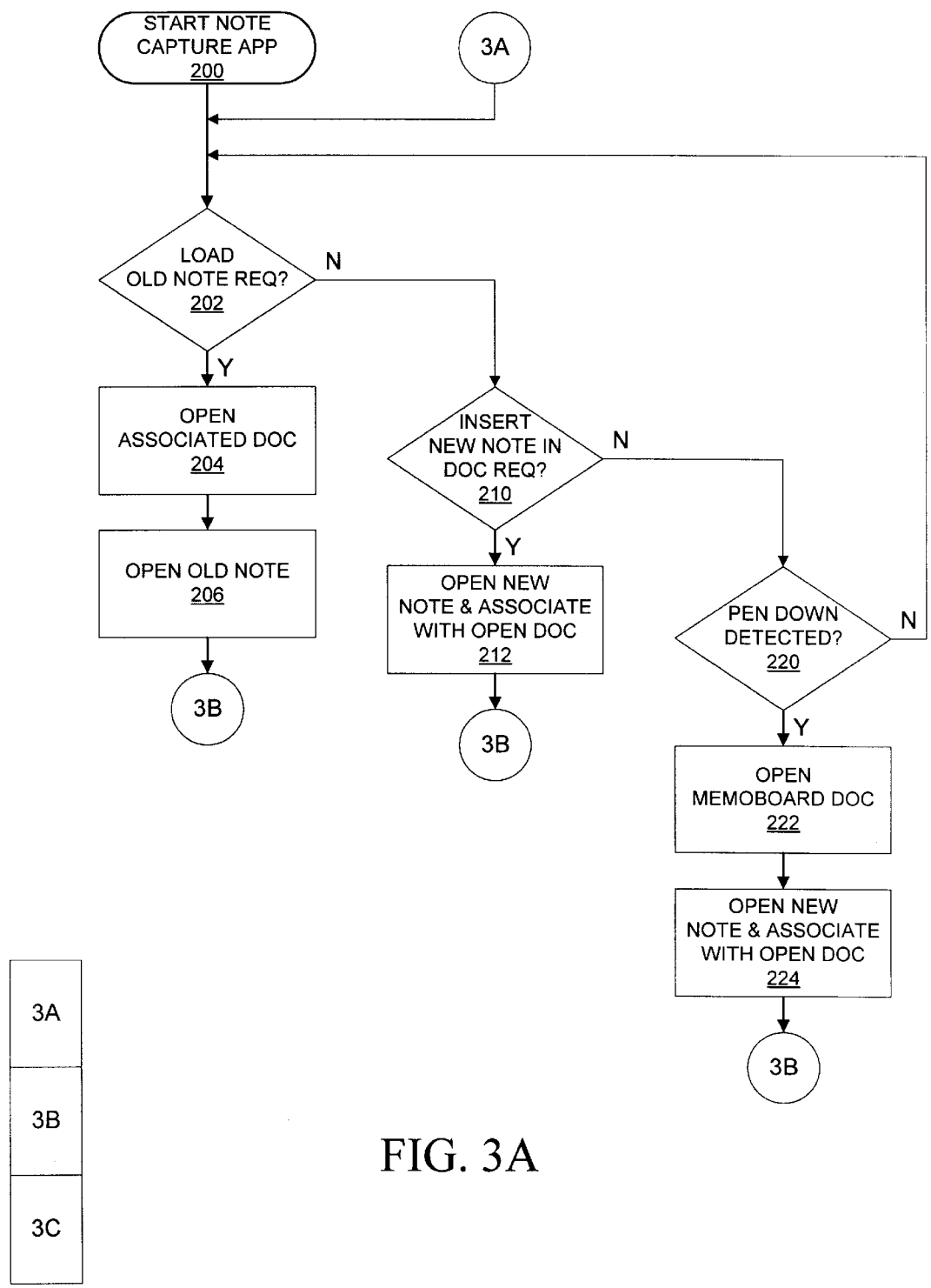
FIGS. 3A, 3B, 3C are flowcharts showing the operation of the note capture device of FIG. 1.
Figure 3B:
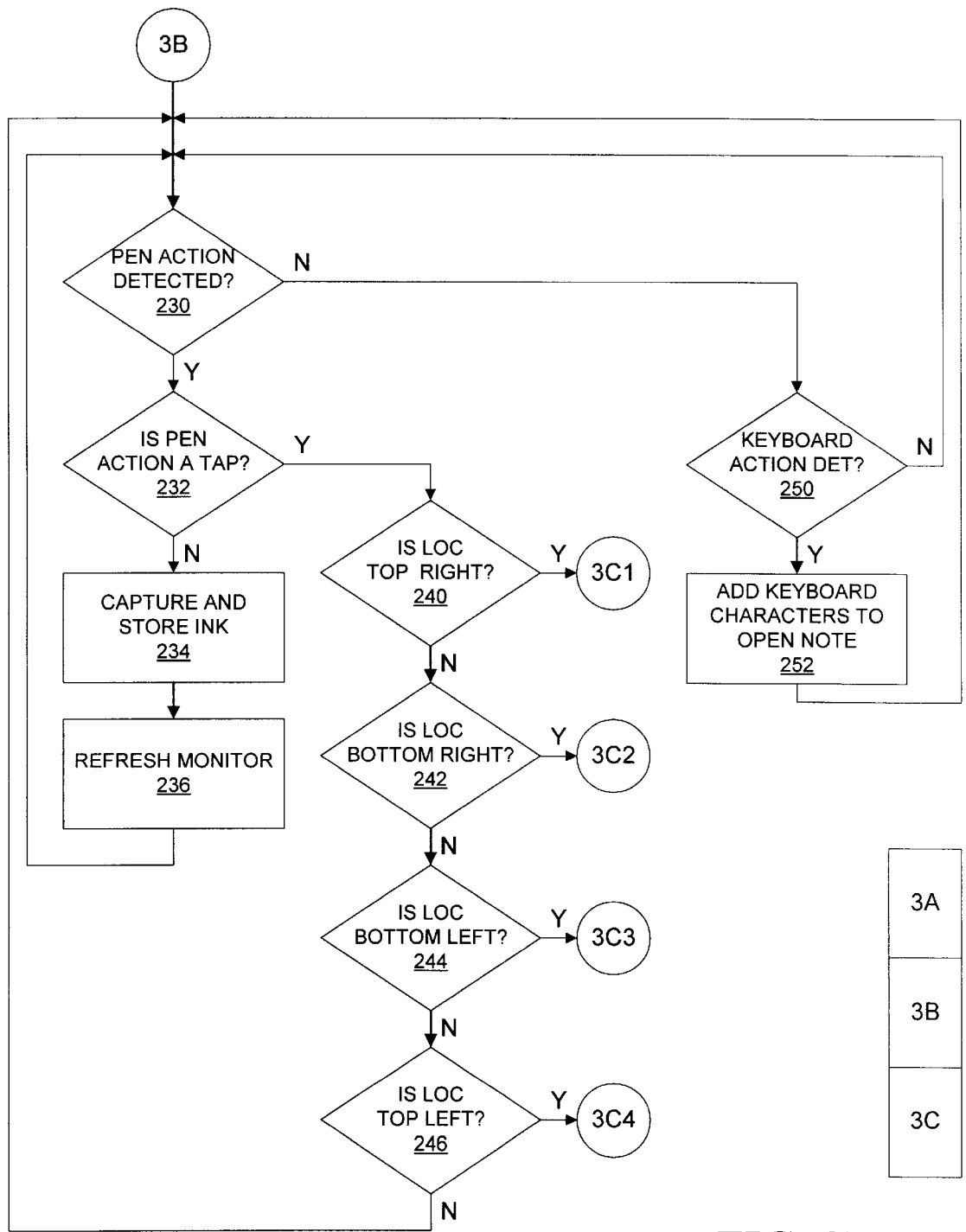
Figure 3C:
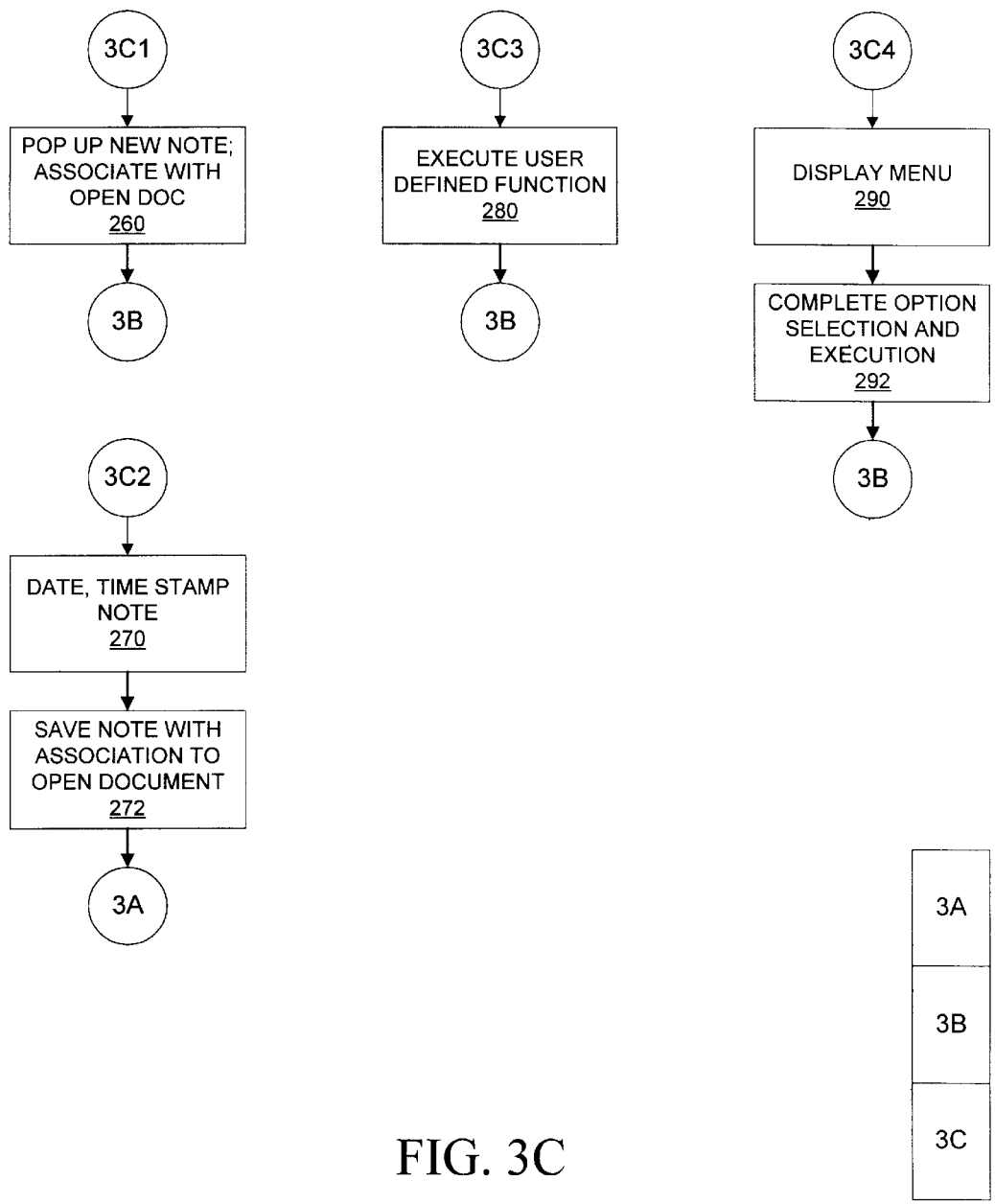

An illustrative host application for use with the note capture device 10 is shown in FIG. 3. The flowchart of FIG. 3 is only one example of a method for the note capture application software, and has been simplified in some respects for clarity. For example, the flowchart of FIG. 3 does not show how to maintain multiple notes open, a task which is well within the ability of one of ordinary skill in the programming arts.

As shown in FIG. 3, a user may request to load an old note (step 202) for review or modification, request to insert a new note into an open application (step 210), or directly open a new note on a memoboard (step 220). If the user requests to load an old note (step 202), the document associated with the old note is opened (step 204), which may involve loading the appropriate application, and the old note is opened and appropriately posted in the associated document. If the user requests to insert a new note into an open document created under a running application (step 210), a new note is opened and associated with the open document (step 212), either by visually posting the note over the document, by including a reference to the note within the document, or by attaching the note as a file to the document, or in any other suitable way. If the user simply begins writing on the notepad so that a pen down condition is detected (step 220), a memoboard application is loaded and a memoboard is opened (step 222), and a new note is opened and associated with the open document (step 224), preferably by visually posting the note on the memoboard.

If a pen action is detected (step 230) and it is not a tap action (step 232), the action is presumed to be a pen stroke. Ink is captured and stored (step 234) and the captured image on the monitor is refreshed (step 236). If instead a keyboard action is detected (step 250), the keyboard characters being typed are added to the open note (step 252).

If the pen action is a tap (step 232) and the tap is in one of the corners of the notepad (steps 240, 242, 244 and 246), the tap is interpreted as a command. The following are examples of suitable commands. A tap in the top right corner (step 240) is a command to pop up a new note and associate it with the open document (step 260). A tap in the lower right corner (step 242) is a command to date and time stamp the open note (step 270) and save it to memory with its association to the open document (step 272). The note capture application may include a user defined function to be evoked by tapping in the lower left corner, so that a tap in the lower left corner (step 244) is a command to execute the user defined function (step 280). A tap in the top left corner (step 246) is a command to display a menu of options (step 290), one of which may be selected in any suitable manner as with the mouse or keyboard and then executed (step 292).

Figure 4:
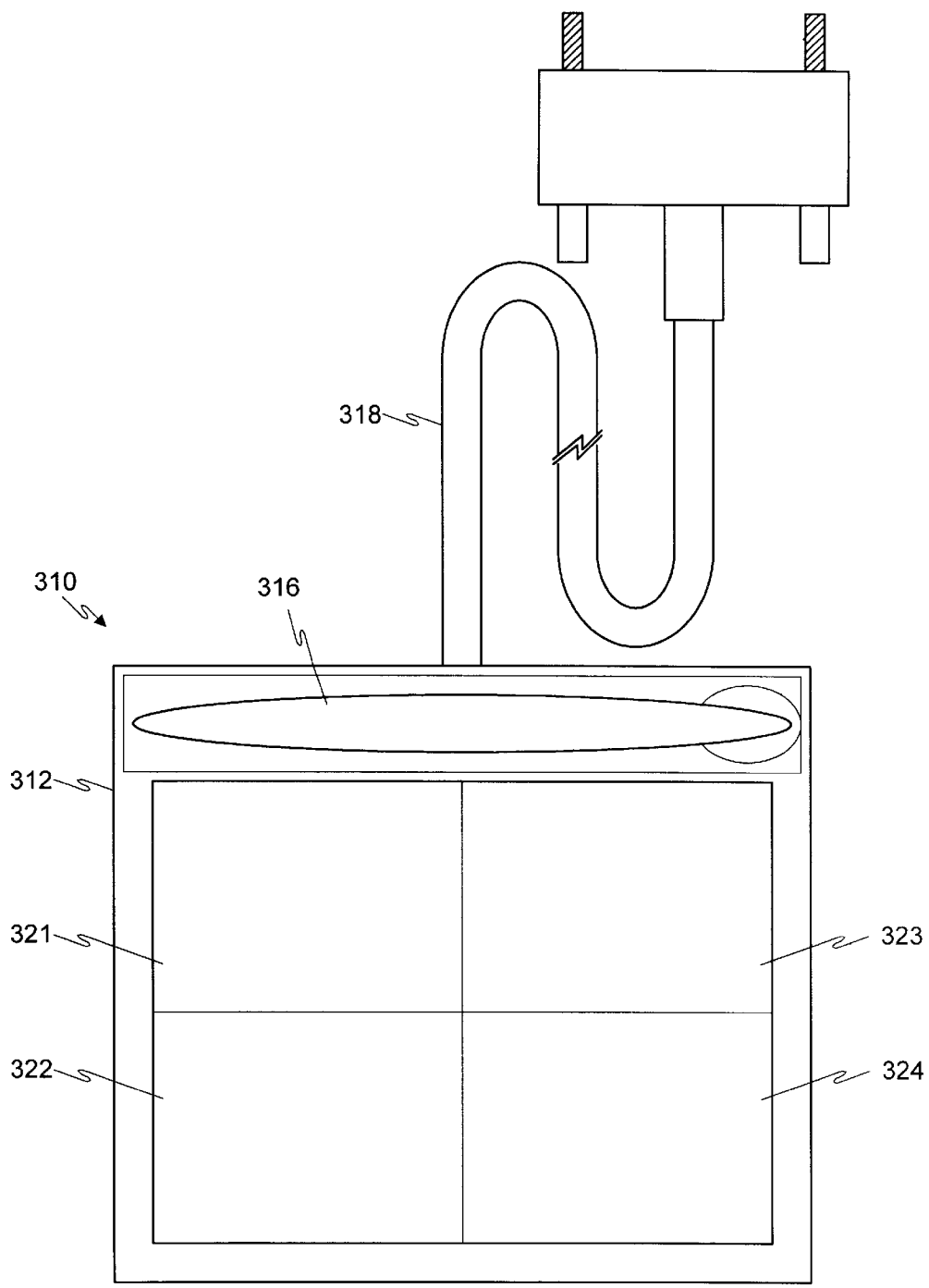
FIG. 4 is a pictorial view of the upper surface of a note capture device having four notepads.

The note capture device 10 may be varied and extended in many ways. FIG. 4 shows a note capture device 310 that has a pen 316, and four separate 2"×1.5" notepads 321, 322, 323 and 324, which may be, for example, Post-it Notes, tiled next to each other and placed over the digitizer tablet area of the housing 312. The note capture device 310 illustratively communicates with the host computer over an RS232 cable 318, and preferably includes a device code so that the note capture applications software running on the host automatically recognizes through handshaking that the note capture device 310 has four tiled 2"×1.5" notepads. If desired, the user may organize the notepads 321, 322, 323 and 324 by colors, each color representing a group of notes. For example a blue note is always attached to a Contact entry, a red note is always attached to a calendar entry, and so forth. Alternatively, the groupings can be done based on the task; for example, for a sales operation, the blue notes are all related to customers, the red notes are related to suppliers, and so forth. As soon as the user starts writing on a particular one of the notepads 321, 322, 323 and 324, the note capture application software is aware of the position of the notepad being written to and assigns the appropriate color to the electronic note and posts the note on, for example, the appropriate memoboard or in the appropriate application of the Outlook email and personal information manager.

Color may also be used to organize notes within an application document. For example, the notepads 321, 322, 323 and 324 may be organized by colors, each color representing a group of notes based on task. For example, for a sales operation, the blue notes are all related to customers, the red notes are related to suppliers, and so forth. As soon as the user starts writing on a particular one of the notepads 321, 322, 323 and 324, the note capture application software is aware of the position of the notepad being written to and assigns the appropriate color to the electronic note and posts the note on, for example, one document such as a memoboard, maintaining correspondence between the color of the physical note and the color of the virtual note. If desired, the notes may be organized by color within the document; for example, all red notes in a column, all blue notes in another column, and so forth. Alternatively, notes of certain colors may be posted on one document while notes of other colors are posted on other documents. For example, all red and blue notes are posted on one memoboard while notes of other colors are posted on another memoboard. If desired, the notes may be organized by color within each document; for example, all red notes in one column and all blue notes in another column on the one memoboard.

The following is an example of how the note capture application automatically posts an note taken during a telephone conversation to the Outlook contact application. The user designates pink notes as notes taken during new telephone contacts. When the user receives a call and starts to write down information about the new telephone contact on his or her Post-it Note, the note capture software automatically causes a new contact document to be opened and creates a Post-it Note image in the large open window of the new contact document. As the user writes on the Post-it Note, the handwriting appears in the window of the new contact document. If the user has time, the user may transcribe any desired parts of the handwritten note into appropriate fields of the new contact document. If the user must answer another call immediately or otherwise is unable to enter the new contact information, the new contact document is simply saved as an untitled document and updated later if the user wants to do so. This technique of seamlessly posting notes into an Outlook application is suitable for a variety of other types of applications as well.

Figure 5:
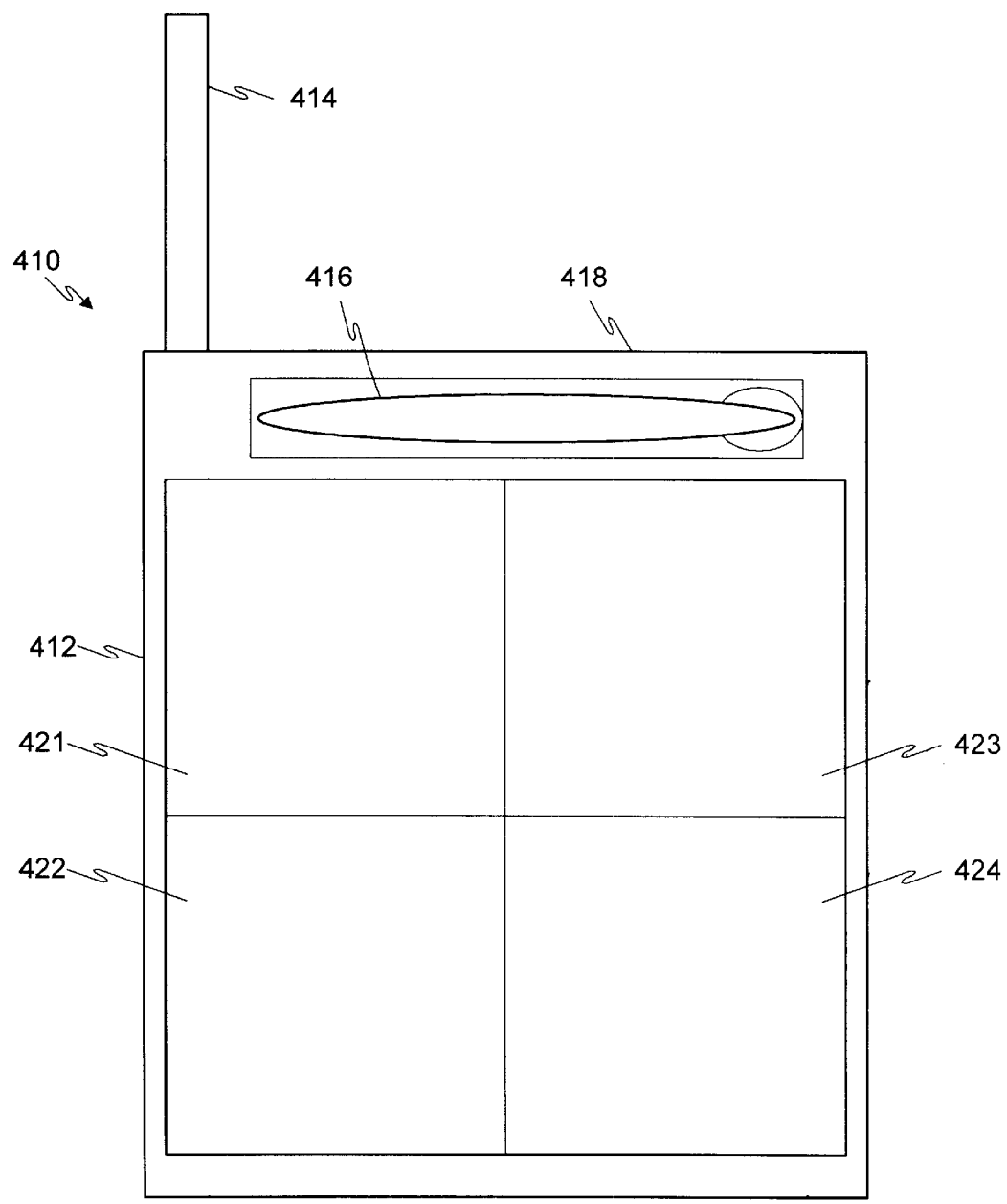
FIG. 5 is a pictorial view of the upper surface of a note capture device having four notepads and an RF transceiver.

FIG. 5 shows a note capture device 410 that has a pen 416 and four separate 3"×3" notepads 421, 422, 423 and 424, which may be, for example, Post-it Notes, tiled next to each other and placed over the digitizer tablet area of the housing 412. Communications with the host computer is over an RF link using antenna 414. The note capture device 410 is powered by batteries in battery compartment 418. The note capture applications software running on the host automatically recognizes through handshaking that the note capture device 410 has four tiled 3"×3" notepads.

Figure 6:
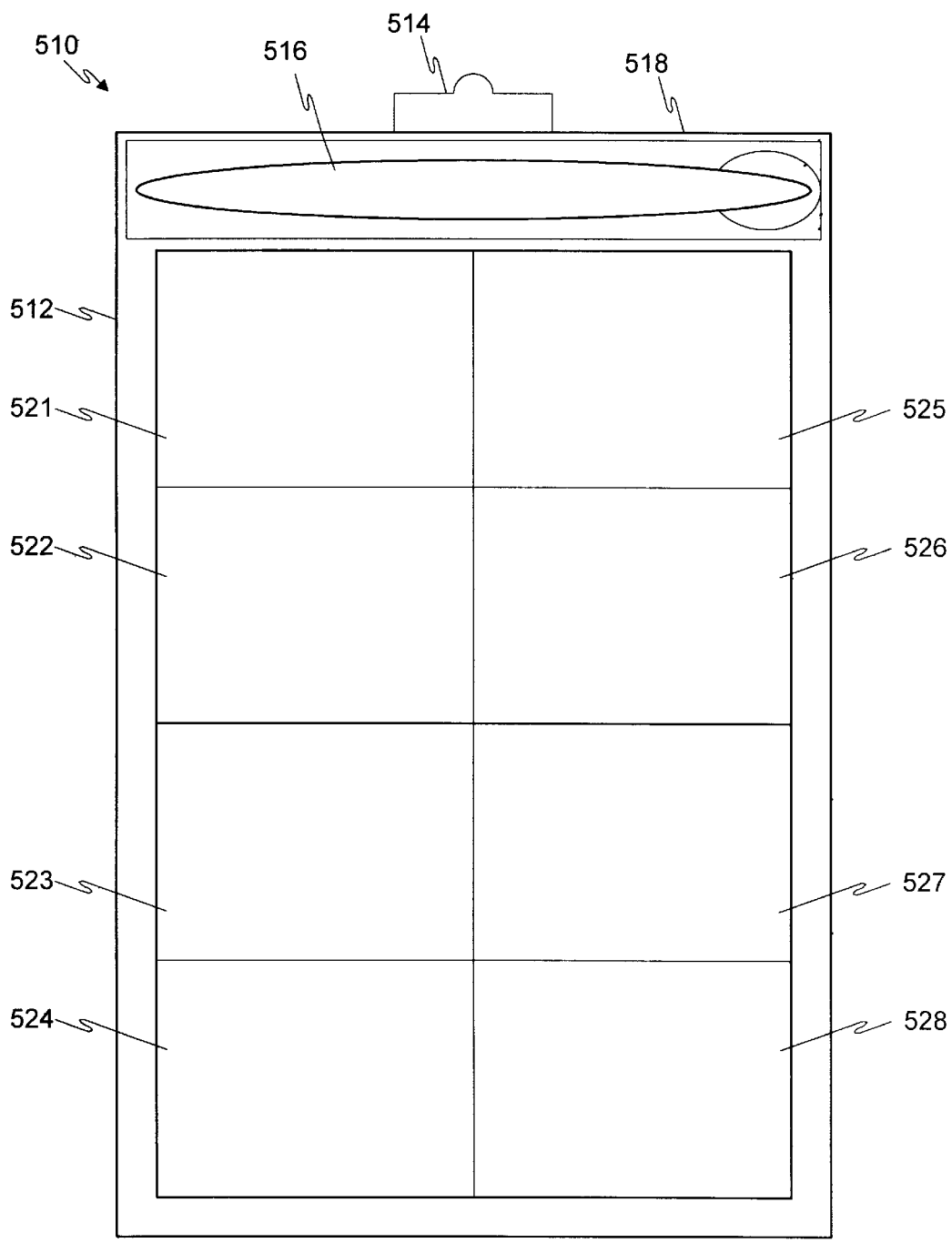
FIG. 6 is a pictorial view of the upper surface of a note capture device having eight notepads and an IR transceiver.

FIG. 6 shows a note capture device 510 that has a pen 516 and eight separate 2"×1.5" notepads 521, 522, 523, 524, 525, 526, 527 and 528, which may be, for example, Post-it Notes, tiled next to each other and placed over the digitizer tablet area of the housing 512. Communications with the host computer is over an IR link using IR port 514. The note capture device 510 is powered by batteries in battery compartment 518. The note capture applications software running on the host automatically recognizes through handshaking that the note capture device 510 has eight tiled 2"×1.5" notepads.

Figure 7:
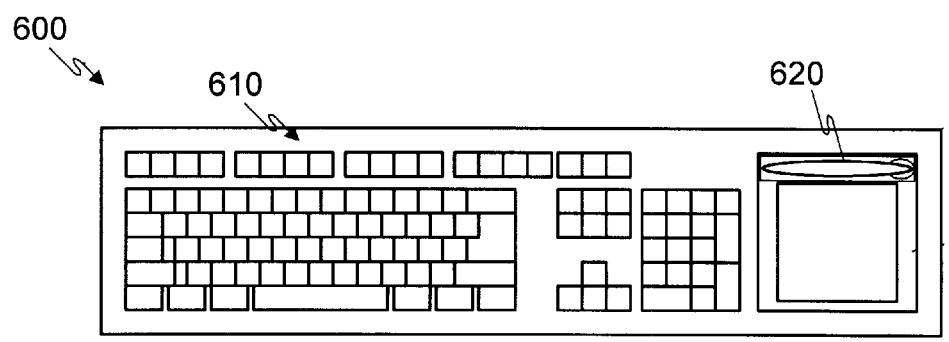
FIGS. 7 and 8 are pictorial views of the upper surfaces of personal computer keyboards which incorporate the note capture device of FIG. 1.
Figure 8:
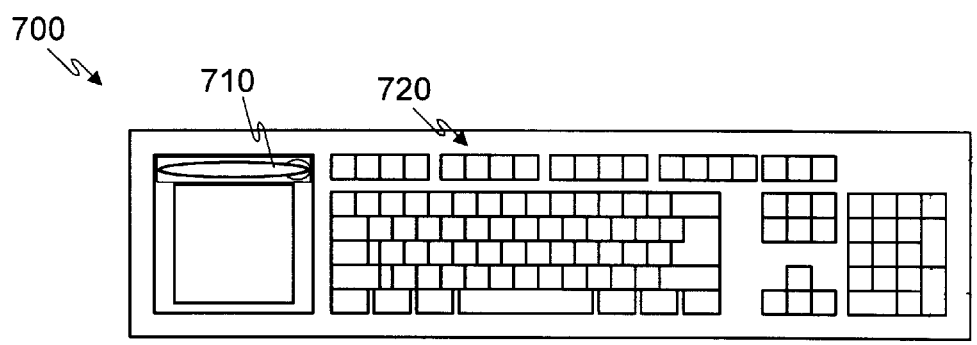

Any of the various note capture devices described herein are ideal for use with a typical office desk, which includes a monitor, a keyboard, and a mouse. An even more organized desktop is achieved by combining a note capture device with a keyboard in a single unit, as shown in FIG. 7 (unit 600 having note capture device 620 and keyboard 610) and FIG. 8 (unit 700 having note capture device 710 and keyboard 720). Preferably, the deck of the keyboard is extended by about 3.5 inches to the right or to the left to accommodate the note capture device for right handed or left handed users. As the keyboard and the note capture device preferably are used alternatively for input and not concurrently, just one connection to the host may be used if desired, thereby saving power and complexity. Suitable keyboard controllers and drivers having the ability to automatically detect whether the input is coming from the note capture device or from the keyboard are within the skill of the person of ordinary skill in the relevant arts.

Many aspects of the note capture systems and components described herein may be supplemented, enhanced, modified, or varied in accordance with the teachings expressed in U.S. patent application Ser. No. 09/294,249 filed Apr. 19, 1999 (Challa et al., Portfolio Apparatus for Portable Handwriting Capture, Attorney Docket No. A1090US) and in U.S. patent application Ser. No. 09/294,250 filed Apr. 19, 1999 (Challa et al., Apparatus and Method for Portable Handwriting Capture, Attorney Docket No. A1091US), which hereby are incorporated herein by reference in their entirety.

The various types of note capture devices described herein allow a computer user to digitally capture handwritten notes quickly and easily into a computer using a Post-it Notes metaphor. Advantageously, a digitally captured handwritten note has a personal character to it which is not possible with a typewritten note. Advantageously, a digitally captured handwritten note effortlessly mixes handwritten or typed text with sketches and drawings. Advantageously, a digitally captured handwritten note is originally handwritten, which is the most natural way for creating a note and which can be done even by unsophistocated computer users and even with one hand while other activities such as answering a phone are being performed. Advantageously, a digitally captured handwritten note may be written in any language, even languages that are not supported by the computer system, and may contain a mix of different languages.

The description of the invention set forth herein is illustrative and is not intended to limit the scope of the invention as set forth in the following claims. Variations and modifications of the embodiments disclosed herein are possible, and alternatives and equivalents of the various elements of the embodiments are known to those of ordinary skill in the art. These and other variations and modifications of the embodiments disclosed herein may be made without departing from the scope and spirit of the invention as set forth in the following claims.

What is claimed is:

1. A method of capturing handwritten notes from a notepad comprising a plurality of stacked adhesive-backed note sheets onto an image capture device having a viewing screen, comprising:

creating a virtual note on the image capture device, the virtual note being a representation of one of the adhesive-backed sheets of the notepad;

detecting a pen action resulting from a stroke of a pen on the notepad sheet;

digitizing the pen stroke to obtain a digital representation thereof, in real time with the pen stroke;

capturing the digital representation of the pen stroke on the virtual note, in real time with the pen stroke;

associating the virtual note with a virtual document existing on the inage capture device;

displaying the virtual note with the virtual document on the viewing screen, in real time with the pen stroke;

detecting a pen action resulting from a tap of the pen at a location on the notepad;

digitizing the location of the pen tap on the notepad;

capturing on the image capture device the digital representation of the location of the pen tap, in real time with the pen tap; and in response to the capturing step, executing an action on the image capture device associated with the location of the pen tap on the notepad;

wherein the location of the pen tap on the notepad is the top right corner, and the action comprises popping up a new note associated with an open application.

2. A method as in claim 1 wherein the location of the pen tap on the notepad is the bottom right corner, and the action comprises time stamping the virtual note and saving the virtual note to memory.

3. A method of capturing handwritten notes from a notepad comprising a plurality of stacked adhesive-backed note sheets onto an image capture device having a viewing screen, comprising:

creating a virtual note on the image capture device, the virtual note being a representation of one of the adhesive-backed sheets of the notepad;

detecting a pen action resulting from a stroke of a pen on the notepad sheet;

digitizing the pen stroke to obtain a digital representation thereof, in real time with the pen stroke;

capturing the digital representation of the pen stroke on the virtual note, in real time with the pen stroke;

associating the virtual note with a virtual document existing on the image capture device;

displaying the virtual note with the virtual document on the viewing screen, in real time with the pen stroke;

detecting a pen action resulting from a tap of the pen at a location on the notepad;

digitizing the location of the pen tap on the notepad;

capturing on the image capture device the digital representation of the location of the pen tap, in real time with the pen tap; and in response to the capturing step, executing an action on the image capture device associated with the location of the pen tap on the notepad;

wherein the location of the pen tap on the notepad is the bottom left corner, and the action comprises executing a user defined function.

4. A method of capturing handwritten notes from a notepad comprising a plurality of stacked adhesive-backed note sheets onto an image capture device having a viewing screen, comprising:

creating a virtual note on the image capture device, the virtual note being a representation of one of the adhesive-backed sheets of the notepad;

detecting a pen action resulting from a stroke of a pen on the notepad sheet;

digitizing the pen stroke to obtain a digital representation thereof, in real time with the pen stroke;

capturing the digital representation of the pen stroke on the virtual note, in real time with the pen stroke;

associating the virtual note with a virtual document existing on the image capture device;

displaying the virtual note with the virtual document on the viewing screen, in real time with the pen stroke;

detecting a pen action resulting from a tap of the pen at a location on the notepad;

digitizing the location of the pen tap on the notepad;

capturing on the image capture device the digital representation of the location of the pen tap, in real time with the pen tap; and in response to the capturing step, executing an action on the image capture device associated with the location of the pen tap on the notepad;

wherein the location of the pen tap on the notepad is the top left corner, and the action comprises displaying a menu of options and completing selection and execution of at least one of the options.

5. A method of capturing handwritten notes from a plurality of notepads onto an image capture device having a viewing screen, comprising:

detecting a pen action resulting from a first stroke of a pen on a sheet of a first one of the notepads;

posting a first virtual note on a virtual document, the first virtual note being a representation of the sheet of the first notepad;

capturing the pen stroke digitally on the first virtual note, in real time with the first pen stroke;

displaying the first virtual note on the virtual document on the viewing screen, in real time with the first pen stroke;

detecting a pen action resulting from a second stroke of a pen on a sheet of a second one of the notepads;

posting a second virtual note on the virtual document, the second virtual note being a representation of the sheet of the second notepad;

capturing the pen stroke digitally on the second virtual note, in real time with the second pen stroke; and displaying the second virtual note on the virtual document on the viewing screen, in real time with the second pen stroke.

6. A method as in claim 5 further comprising:

assigning a first color to the first notepad; and assigning a second color to the second notepad;

wherein the first virtual note displaying step comprises displaying the first virtual note in the first color; and wherein the second virtual note displaying step comprises displaying the second virtual note in the second color.

7. A method as in claim 6 further comprising organizing the first virtual note and the second virtual note on the virtual document by color.

8. A method as in claim 7 wherein the associating step comprises:

establishing a color to represent the document; and assigning the color to the notepad.

* * * * *